United States Patent
Sacco

(10) Patent No.: US 8,566,324 B1
(45) Date of Patent: Oct. 22, 2013

(54) INVERTED INDEX AND INVERTED LIST PROCESS FOR STORING AND RETRIEVING INFORMATION

(76) Inventor: Giovanni M Sacco, Torino (IT)

( * ) Notice: Subject to any disclaimer, the term of this patent is extended or adjusted under 35 U.S.C. 154(b) by 266 days.

(21) Appl. No.: 12/880,129

(22) Filed: Sep. 12, 2010

(51) Int. Cl.
*G06F 17/30* (2006.01)

(52) U.S. Cl.
CPC .............................. *G06F 17/30017* (2013.01)
USPC .......................................................... 707/742

(58) Field of Classification Search
USPC .................................. 707/711, 741, 742, 746
See application file for complete search history.

(56) References Cited

U.S. PATENT DOCUMENTS

| | | | |
|---|---|---|---|
| 4,606,002 A | | 8/1986 | Waisman et al. |
| 5,704,060 A | * | 12/1997 | Del Monte ............................ 1/1 |
| 5,852,822 A | | 12/1998 | Srinivasan et al. |
| 5,884,276 A | | 3/1999 | Zhu et al. |
| 5,940,833 A | | 8/1999 | Benson |
| 6,055,526 A | * | 4/2000 | Ambroziak ................... 707/693 |
| 6,460,047 B1 | * | 10/2002 | Ambroziak ........................... 1/1 |
| 7,149,748 B1 | | 12/2006 | Stephan |
| 7,487,141 B1 | | 2/2009 | Stephan |
| 2002/0091715 A1 | | 7/2002 | Coady |
| 2007/0198621 A1 | | 8/2007 | Lumsdaine et al. |
| 2008/0133565 A1 | | 6/2008 | Yasuda et al. |
| 2009/0313238 A1 | | 12/2009 | Merrigan et al. |

OTHER PUBLICATIONS

Anh, V.N. et al., inverted index compression using word-aligned binary codes, 2006, IEEE, vol. 18, 857-861.*
A. Moffat et al., "Self-Indexing Inverted Files for Fast Text Retrieval," ACM Transactions on Information Systems 14, 4 (Oct. 1996), pp. 349-379.
Zobel, J. And Moffat, A. 2006. Inverted files for text search engines. ACM Comput. Surv. 38, 2.
Bast, H. and Weber, I. 2006. Type less, find more: fast autocompletionvsearch with a succinct index. In Proceedings of the 29th Annual international ACM SIGIR Conference on Research and Development in information Retrieval (Seattle, Washington, USA, Aug. 6-11, 2006). SIGIR '06. ACM, New York, NY, 364-371.
Tomohiro Yasuda et al, Device and method for constructing inverted indexes, U.S. Appl. No. 11/936,277, Nov. 7, 2007.
Wolfgang Stephan, Expanded inverted index, US Patent 7149748, Dec. 12, 2006.
Max Benson, Compressing sets of integers, US Patent 5940833, Aug. 17, 1999.
Capon, J., "A Probabilistic Model for Run-Length Coding of Pictures," IEEE Transaction of Information Theory, 1959.
Elias, P., "Universal Codeword Sets and Representation of Integers," IEEE Transactions on Information Theory IT-21 (2):194-203, Mar. 1975.
Zobel, J. and Moffat, A., 2006, "Inverted Files for Text Search Engines," ACM Comput. Surv. 38, 2.
Vo Ngoc Anh, Alistair Moffat, "Inverted Index Compression Using Word-Aligned Binary Codes," Information Retrieval, v.8 n. 1, p. 151-166, Jan. 2005.
Sergey Melnik et al., "Building a Distributed Full-Text Index for the Web," Proceedings of the 10th International Conference on Word Wide Web, p. 396-406, May 1-5, 2001.
A. Moffat et al., Self-Indexing Inverted Files for Fast Text Retrieval, ACM Transactions on Information Systems 14, 4 (Oct. 1996), pp. 349-379.
H. Bast et al., "Type Less, Find More: Fast Autocompletion Search with a Succinct Index," In Proceedings of the 29th Annual International ACM SIGIR Conference on Research and Development in Information Retrieval, Aug. 6-11, 2006, pp. 364-371.
T. Yasuda et al., "Device and Method for Constructing Inverted Indexes," Nov. 7, 2007, U.S. Appl. No. 11/936,277.

* cited by examiner

*Primary Examiner* — Jean B Fleurantin

(57) ABSTRACT

A process is disclosed for the computer management of inverted lists and inverted indices, in which the standard representation and processing of inverted lists is changed in order to achieve a simpler, more compact and more efficient architecture.

2 Claims, No Drawings

INVERTED INDEX AND INVERTED LIST PROCESS FOR STORING AND RETRIEVING INFORMATION

BACKGROUND OF THE INVENTION

An inverted list $<K_j, \{p_0, \ldots, p_i, p_{N-1}\}>$ is a data structure that stores a mapping from a key $K_j$ (such as, for instance, a database key or a query term) to a list of one or more pointers $p_i$ to objects in a structured, semi-structured or unstructured database. In structured databases, where the key consists of a database key composed of one or more attributes, the list contains the logical or physical pointers to the records containing the database key. As an example, let the database key be the attribute Color for a relation Car. The inverted list for Color=red contains the logical or physical pointers to all the records in the Car relation for which the attribute Color has the value red. A physical pointer is an address to a specific location, whereas a logical pointer is a unique object identifier that can be mapped to a physical location by some translation mechanism. As an example, a logical pointer to a database record can be a unique identifier assigned by the system (typically an increasing integer number) that is mapped to a physical location by a translation table.

Inverted lists are used in many information technology applications. In addition to structured databases, an important application area is text retrieval. In this context, the key represents a term (or, usually, a unique term identifier) and the list enumerates all the documents (usually represented by unique identifiers) in the collection containing that term. Another important area is represented by dynamic taxonomies (Sacco, G., Dynamic taxonomy process for browsing and retrieving information in large heterogeneous data bases, U.S. Pat. No. 6,763,349, U.S. Pat. No. 7,340,451) where the deep extension of concepts (i.e. the set of objects classified under a concept or one of its descendants) can be represented by inverted lists, where the key is a concept identifier and the list includes all the identifiers for the objects in the deep extension of that concept.

The key in an inverted list may be of variable size. The list is often kept ordered because this allows to perform list operations such as intersection, union, subtraction, etc. (which implement boolean operations on keys) in linear time.

Inverted lists are stored in inverted indices, which allow quick access to the inverted list corresponding to a search key. Such inverted indices are stored in computer memory, and generally on secondary storage. They are usually organized as B-trees or variations (Comer, D. The Ubiquitous B-Tree. ACM Computing. Surveys, 11, 2 (June 1979), 121-137; Bayer, R. and Unterauer, K. 1977. Prefix B-trees. ACM Trans. Database Syst. 2, 1 (March 1977), 11-26). These structures order records in such a way that the physical order of records in the file is the same as the logical order of the index keys. In this present case, the records inserted in the index are the inverted lists, and index keys are the inverted list keys. Indices are usually organized into fixed-size pages, a page being the minimum access unit.

Inverted lists and inverted indices present several problems. First, for large information bases or information bases with a non-uniform distribution of keys, many inverted lists may contain a large number of pointers, and, in general, span several pages. It is quite difficult and expensive to perform insertions and deletions in these cases, if the pointers in the inverted list are to be maintained ordered so that list operations can be performed in a linear time.

Another problem of inverted lists and inverted indices is the space required by these structures. In naïve implementations, the overhead of these structures can be so large as to be impractical for large applications. For instance, in text-retrieval applications, the size of the inverted index can be as large as or larger than the size of the indexed text corpus.

Finally, even if a linear time is required for list operations on sorted lists, list operations can be too expensive in very large applications.

SUMMARY OF THE INVENTION

The invention described in the following changes the standard representation of inverted lists in several ways in order to achieve a simpler, more compact and a more efficient architecture. In particular, a normalized inverted list structure is presented, in which the inverted list $<K_j, \{p_0, \ldots, p_i, p_{N-1}\}>$ is represented by N records containing its constituent pairs $<K_j, p_k>$, $0 \le k \le N-1$. This representation makes insertions and deletions in an ordered inverted list considerably simpler, because such operations are performed by record insertion/deletion operations on the inverted index. In order to avoid the space overhead incurred by storing the inverted list key in each record, a prefix compression can be used. In prefix compression, the records in each page are stored sequentially according to the key logical order, and the prefix of a record which is the same as the prefix of the previous record is factored out. Since prefix compression usually requires a larger computational effort to search for a specific key, efficient evaluation methods are introduced.

Finally, the normalized inverted lists structure is extended to efficiently represent contiguous intervals of pointer values. This extension allows a more compact representation of large lists, and, most importantly, list operations which are sublinear with respect to the number of pointers in the lists.

Although, as noted, inverted indices are usually organized as B-trees or variations, the present invention can be easily extended to different index structures.

DESCRIPTION OF PREFERRED EMBODIMENTS

All the methods and the operations described here are performed on a computer. The first change made to the standard inverted list representation is called normalization and transforms a single inverted list $<K_j, \{p_0, \ldots, p_i, p_{N-1}\}>$ of length N, where $K_j$ is the key and $\{p_0, \ldots, p_i, p_{N-1}\}$ is the list, into N pairs $<K_j, p_0>$ to $<K_j, p_{N-1}>$. Each pair $<K_j, p_i>$ is a record. In terms of the relational model, the primary key of the relation storing the normalized list is the pair $<K_j, p_i>$, i.e., there cannot be two records with the same inverted list key and pointer in the relation.

In order to access the entire normalized inverted list, a prefix scan is implemented. The prefix scan for a search key K' uses the index to access the first record $<K_j, p_0>$, with $K_j = K'$ (K' is the prefix of the record to be found). Subsequently, it performs a sequential scan fetching all the subsequent records with $K_j = K'$, until a record with $K_l > K'$ or the end of file is encountered. In order to simplify prefix scans, normalized list data (including the list key) are usually stored in such a way as to maintain lexicographic order in byte-by-byte comparisons, although this is not a requirement of the present invention. In particular, numeric data and pointers are usually stored in big-endian order, i.e., the most significant byte is stored first. Dates are usually stored in year-month-day format, and strings as null-terminated character sequences. In the following, it is assumed for expediency that each character is stored in a single byte, but this is not a requirement and an arbitrary number of bytes can be used to store each character.

In some cases, additional data needs to be associated to each entry. As an example, in text retrieval applications, one might want to maintain the frequency information for a term t for each document in which t appears. In this case, the frequency information will be added to each pair. The record will then be a triple <$K_j$, $p_i$, $a_i$>, where $a_i$ is the additional information, and <$K_j$, $p_i$> continues to be the primary key of the relation storing the list, i.e., no two pairs with same value exist in the file.

An advantage of using a normalized architecture is that the ordering of the inverted list is performed by the inverted index itself (an index that guarantees a physical order matching the logical orders of keys, such as B-trees or variations, is assumed). An additional advantage is that very long lists do not pose any challenge because they are represented as a set of small records, instead of a single record. Inverted lists are difficult to implement in the standard single-record architecture because they usually require a main memory space equal to the size of the list, and complex allocation strategies if the list cannot be entirely stored into a single page.

Of course, these advantages are paid in terms of additional space required, as the key K is not factored out, but it is repeated in each pair. This problem can be overcome by using a prefix compression in the inverted index. Prefix compression encodes as an integer the number of bytes of the current record which are a common prefix with respect to the previous record in the same page. The common prefix is not stored. The first record in a page has a 0 common prefix as there is no previous record in the same page. For ease of exposition, a prefix compression on bytes is assumed in the following. However, different compression units composed by chunks of n bits can be used in practice. As an example, assume that we have record ABCD followed by record ABZQ. The length of the common prefix is 2 and only the suffix ZQ of record ABZQ is stored. As we note below, the length of the common prefix 2 is explicitly stored in some descriptor.

By compressing the common prefix of consecutive records, the overhead of the key in each pair is eliminated at the slight expense of storing the encoded common prefix. In addition, the prefix compression will usually compress a significant part of the pointer, which is stored in big-endian byte order (i.e., the most significant byte value is stored at the memory location with the lowest address, the next byte value in significance is stored at the following memory location and so on). Finally, prefix compression will also compress the common prefix of two different consecutive keys.

The common prefix length is stored in a descriptor which can be used to store the record length as well. The record length is the length of the suffix, after the common prefix is removed. The record length needs to be explicitly stored only for variable-length records. The descriptor generally uses an integral number of bytes, but different storage units can be used. In addition, different representations for the compression information can be used.

It must be noted that, although we associate each pointer to its key, we can more generally associate a chunk of j pointers to their key. That is, the ordered list of N pointers is partitioned into ceiling(N/j) chunks, and each chunk is stored together with the inverted list key. The chunk size j represents the maximum number of pointers that can be stored inside a chunk. Therefore, the actual number of pointers in each chunk must be stored in the record descriptor. Prefix compression can be used. Insertion and deletion operations can be implemented by splitting, balancing, and recombining chunks in a way similar to the same operations on B-trees. Thus, on insertion of pointer p, the appropriate chunk is located. If the chunk is not full (i.e. the number of pointers is less than j), then the pointer is inserted in the appropriate sorted position in the chunk. Otherwise, the chunk is split into two ordered chunks, and insertion in the appropriate chunk is performed. Similarly, on deletion, the pointer is simply deleted if the number of pointers is larger than a predefined quantity. Otherwise, after deletion, the current chunk is combined with the previous or following chunk, if possible. If recombination is not possible, then rebalancing with an adjacent chunk may be performed, where pointers from the other chunk are transferred to the current underflow chunk.

Prefix compression requires that records in a page are accessed and stored in primary key order, and makes the location of a requested record in a page a sequential process. In fact, a stored record can only be reconstructed, in the general case, through the previous records. The normal process of locating a search key K' of length N bytes (for strings, N may include the null string terminator) in a page starts from the first record in the page which, by definition, is not compressed and has a common prefix length equal to 0. A variable P is kept which stores the previous record in the page (P is initially null). The records in the page are scanned sequentially, and each record is decompressed by storing in P the suffix of the current record at an offset equal to the common prefix length. Once the original record is reconstructed, the search key is compared with the normalized inverted list key and a match is found if the first N bytes of both keys are the same.

Although we assume, for simplicity, a complete record decompression, it should be noted that in practice the maximum common prefix length L is a predefined quantity, and only L bytes are compressed for longer common prefixes. Consequently, only a maximum of L bytes need to be decompressed.

More efficient implementations can be used. Assume that the search routine is only required to return the decompressed normalized inverted list record or null, if the record is not found. The required record can be more efficiently located in the following way. Initially set P to the first record in the page. Compare the search key with the key of that record. If they match, return P. Otherwise, let D be the first byte that is different between the two keys. On the subsequent forward scan, all records with a common prefix equal to or larger than D can be simply ignored and not even decompressed. If the common prefix is smaller than D−1, then the search can be stopped because the record requested cannot be found. If the common prefix is equal to D−1, then the record can be decompressed using P as the previous record, and the search key compared with the record. If they match, return P. Otherwise, recompute D and iterate. If the end of the current page is found without locating the search key, then the record requested is not found.

In some cases, for instance when a new record needs to be inserted, the largest key smaller than the search key (or the smallest key larger than the search key, in other cases) must be returned, if the search key is not found. In general, this requires the normal iterative decompression process. The method presented here avoids record decompression by using the efficient implementation described above and keeping pointers to the minimum set of records required for decompression after the search has completed.

Assume that we want to return the largest key smaller than the search key whenever the search key is not found. A stack is kept during the search. Each stack element is a pair <slength, spointer> where spointer is the pointer to a record, and slength is the length of the prefix of spointer in common with the previous record. Initially, the stack contains the element <0, sp>, where sp is the pointer to the first record in the page. Each record r accessed during the forward scan is pushed into the stack as the element <slength(r), spointer(r)>. However, before inserting the record at the top of the stack, the current element tp=<slength(tp), spointer(tp)> at the top of the stack is iteratively removed if slength(r)≤slength(tp). These elements are, in fact, useless for reconstructing the final record.

If the common prefix of the current record is smaller than D−1, then the record is not found. The element corresponding to the current record is not pushed into the stack. The stack is processed from the bottom of the stack to the top. Let N the number of elements in the stack, 1≤i≤N be the current element, i+1 the next one, and KL(k) be the common prefix length of record k with respect to record k−1. Let R be the result record, an array of bytes with initial index at 0, initially empty. For each i, copy KL(i+1)-KL(i) bytes of the suffix of record i at the KL(i) position in R. For the top of the stack (i=N), copy the record suffix at the KL(N)+1 position in R.

This method can be easily modified in order to return the smallest key larger than the search key, or to use a different data structure, as long as the minimum set of records required for decompression is retained.

In order to improve the performance of sequential scans, a cursor can be maintained for each active scan. The cursor stores the current decompressed record, and its position in the page. Accessing the next record in the page only requires decompressing the next record using the current decompressed record. The cursor may be made invalid by insertion and deletion operations.

Significant deviations from uniformity can occur for key distributions. As an example, the distribution of words in a collection of documents is known to follow a Zipf's law. This implies that a large number of words will appear only once in the corpus. In these frequent cases, prefix compression will only work on the common prefix of two different subsequent keys, but no compression will occur for pointers. It can be therefore beneficial to use a different compression scheme for pointers. A bit prefix can be used to indicate the number of non empty prefix bit-chunks (the bit-chunk unit is usually the byte) in the pointer, which is stored in big-endian order. As an example, let pointers be defined on 4 bytes. The first (most significant) two bits in the pointer indicate the complement of the number of zero bytes in the prefix. A maximum of 3 bytes is considered, because 4 zero bytes occur only when the value of the pointer is zero, an event that can be ignored for compression. So, if the pointer is equal to 1 and has therefore three zero bytes in the prefix, a single byte with the first two bits set to the complement of 3, that is 0, will be used. The complement is used to maintain the lexicographic order in the key. This technique is easily extended to pointer sizes equal to n, for which the bit encoding requires ceiling(log 2 n) bits. Null-prefix encoding can be stored in the pointer itself, or factored out and stored elsewhere. Although it was applied to pointers, it can be applied to any integer or floating point field.

As the size of an inverted list grows, so does the probability that contiguous pointers will be found. Two pointers are defined contiguous if the absolute value of their difference is equal to a predefined constant d (usually d=1). In some applications, such as notably dynamic taxonomies, the topmost concept includes by definition all the objects in the collection, so that all the logical pointers (object identifiers) in the list are contiguous. Although contiguous pointers are efficiently compressed by prefix compression, a different representation can achieve a better compression and, at the same time, a more efficient evaluation of list operations. Whereas previous research focuses on the gaps between pointers and efficient encodings for such gaps, the present invention takes the opposite direction and focuses on the representation of intervals of contiguous values. Thus a normalized entry is no longer a pair <Kj, pi> but a triple <Kj, pi, delta>, where delta is the length of a run of contiguous pointers and consequently delta=0 if the next pointer pi+1 is not contiguous to pi. The primary key is the pair <Kj, pi>, meaning that there are no pairs with duplicate values in the inverted index.

Since non-uniform key distributions make one-element lists relatively frequent, space requirements for one-element lists should be minimized. In order to minimize the overhead caused by a small or null delta, delta is represented in small-endian (i.e., the least significant byte value is at the lowest address; the other bytes follow in increasing order of significance) and is compressed by dropping its zero-byte suffix. Thus a delta=0 requires no space overhead. Such a suffix compression makes the record of variable length, and either the length of the record, or the length of the dropped suffix has to be encoded in the record descriptor.

In addition to a more efficient data compression, interval representation allows list operations that have a sublinear complexity in the number of pointers in the list. We describe intersection, union and subtraction operations. Extensions to other operations are easily done by persons with ordinary skill in the art.

Unless otherwise stated, operations are on N lists, and each list i has a current cursor Ci whose component Ci.pos identifies the current position in the ordered list of records, and whose component Ci.cont represents a range of contiguous pointers in the form <ps, pe>, where ps identifies the first pointer in the range and pe the last pointer in the range. Ci.cont is set when the current record (identified by Ci.pos) is read and it is derived from the current record <K, p, delta>, where p is the first pointer in the range, and delta is the length of the interval of contiguous pointers, by setting ps=p and pe=ps+delta.

The access structure in which the lists are stored allows to advance the current cursor to the next element. If such element does not exist, an end-of-scan condition is raised and processing for the list is terminated. The access structure also allows to advance the current cursor to a value x. If x≤Ci.cont.pe, the cursor is not advanced, and Ci.cont.ps is set to x if Ci.cont.ps≤x (Ci.cont.ps is not changed otherwise). If x>Ci.cont.pe, the cursor is advanced to the next element until Ci.cont.ps≤x≤Ci.cont.pe (if Ci.cont.ps<x, then Ci.cont.ps is set to x). If such element does not exist, an end-of-scan condition is raised and the processing for the list is terminated.

The following functions and operations, like all the operations described in this application, can be carried out on a computer, and these functions can be visualized as flowcharts to be executed on the computer.

Intersection

At each step, let minp be the minimum pe for all the cursors and maxp be the maximum ps for all the cursors.

If minp≥maxp, then output <maxp, minp> and advance each cursor to minp+1, recomputing minp and maxp. Otherwise, advance the cursor with the minimum pe to the next element, recomputing maxp and minp.

In both cases, iterate until a cursor raises the end-of-scan condition during advancing.

Union

Create a data structure V that keeps the cursors ordered by increasing ps.

Let W be the element in V with the lowest ps.

Initialize the current output CO to W.cont, advance the cursor in W and update V.

Iteratively check W.

If W.cont.ps≤CO.pe+1, then set CO.pe to max(CO.pe, W.pe). Otherwise, output CO, and set CO to W.cont. In both cases, advance the cursor in W, update V and iterate.

If a cursor raises the end-of-scan condition during advancing, eliminate it from V. The process terminates when all the cursors have raised the end-of-scan condition and have been eliminated; CO is output.

Subtraction

Let A and B be two interval inverted lists, and the expression to be computed be A−B.

Let Unload(A) be a procedure that appends to the output all the elements in A from the current cursor to the end.

At each step, CA.cont.ps and CB.cont.ps are compared:
if CB.cont.ps<CA.cont.ps, CB is advanced to CA.cont.ps. If this causes an end-of-scan condition, then Unload(A) is called and the process terminates, otherwise the process iterates.

if CB.cont.ps=CA.cont.ps, let w be the minimum value between CA.cont.pe+1 and CB.cont.pe+1. CA is advanced to w; if this causes an end-of-scan condition then the process terminates. CB is advanced to w. If this causes an end-of-scan condition, then Unload(A) is called and the process terminates, otherwise the process iterates.

if CB.cont.ps>CA.cont.ps:

if CB.cont.ps>CA.cont.pe, output CA.cont, and advance CA to the next element; if this causes an end-of-scan condition then the process terminates else output <CA.cont.ps, CB.cont.ps−1> and if (CB.cont.pe≤CA.cont.pe) CA is advanced to CB.cont.pe+1, if this causes an end-of-scan condition then the process terminates; CB is advanced to the next element, if this causes an end-of-scan condition, then Unload(A) is called and the process terminates. Otherwise, the process iterates.

else CA is advanced to the next element, if this causes an end-of-scan condition then the process terminates; CB is advanced to CA.cont.pe+1, if this causes an end-of-scan condition, then Unload(A) is called and the process terminates. Otherwise, the process iterates.

As a concrete example of the benefits of the above methods and without any loss of generality, consider search engines. As mentioned above, search engines are usually based on inverted lists as a method to store and efficiently retrieve information. The methods presented here compress inverted lists in such a way that space requirements for inverted lists significantly decrease, with a consequent decrease of secondary storage space and of cost of access to secondary devices. Although compression generally requires a computational overhead to decompress data, the current methods support a much faster execution of the principal operations, which coupled with the methods described above to speed decompression up, result in significant execution time benefits. Hence, for a given set of documents and query workload, fewer or less powerful machines are required to support a given level of service. This results in very significant savings not only in costs of ownership, but also in operating costs such as energy costs.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, the methods can be applied to other search and data management applications.

Those of skill would further appreciate that the various illustrative logical blocks, modules, and algorithm steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

Also, the inventor intends that only those claims which use the words "means for" are intended to be interpreted under 35 USC 112, sixth paragraph. Moreover, no limitations from the specification are intended to be read into any claims, unless those limitations are expressly included in the claims. The computer described herein may be any kind of computer, either general purpose, or some specific purpose computer such as a workstation, or any organization of computers interconnected by whatever means and locally or geographically distributed. The computer may also be a server or a server farm implementing a website. The computer may be programmed by any programming language. Secondary storage defines generic storage devices (including main memory) that maintain information that the computer can access, and may use any type of technology for this purpose.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of using a computer to represent an inverted list record containing a key and one or more pointers, the number of said pointers being n, said pointers being logical or physical pointers, by n records, the i-th record including the key of said inverted list record followed by the i-th pointer in said inverted list record, where each record is stored by said computer in an index structure organized by data pages and said computer operating for implementing a prefix compression, said prefix compression being obtained by identifying the common prefix that the current record to be compressed has in common with the previous record in the page, said common prefix being empty if the current record is the first record in the page, said record being stored as the length of the common prefix and said record without the common prefix, where each group of pointers with contiguous values is represented by a single record containing the key of said inverted list, the lowest pointer value in the group of pointers, and the difference between the highest pointer value in the group and the lowest pointer value in the group, said group having one or more pointers, further characterized by using the computer for computing an intersection of N inverted lists, each list J having a cursor C[J] with a component C[J].pos identifying a current position in the ordered list of records, and a component C[J].cont representing a range of contiguous pointers in the form <ps, pe>, where ps identifies the first pointer in a range and pe the last pointer in the range, C[J].cont being set when the current record identified by C[J].pos is read and being derived from the current record <K, p, delta>, where p is the first pointer in the range, and delta is the length of the interval of contiguous pointers, by setting pS=P and pe=ps+delta and further characterized by the computer carrying out the following steps:
  a. compute minp as the minimum pe for all the cursors and maxp as the maximum ps for all the cursors;
  b. if min p>=maxp then output <maxp, minp> and advance each cursor to minp+1, otherwise advance the cursor with the minimum pe to the next element, iterate in both cases steps a and b until any cursor reaches the end of file during advancing.

2. A method of using a computer to represent an inverted list record containing a key and one or more pointers, the number of said pointers being n, said pointers being logical or physical pointers, by n records, the i-th record including the key of said inverted list record followed by the i-th pointer in said inverted list record, where each record is stored by said computer in an index structure organized by data pages and said computer operating for implementing a prefix compression, said prefix compression being obtained by identifying the common prefix that the current record to be compressed has in common with the previous record in the page, said common prefix being empty if the current record is the first record in the page, said record being stored as the length of the common prefix and said record without the common prefix, where each group of pointers with contiguous values is represented by a single record containing the key of said inverted list, the lowest pointer value in the group of pointers, and the difference between the highest pointer value in the group and the lowest pointer value in the group, said group having one or more pointers, further characterized by using the computer for computing a union of N inverted lists, each list J having a cursor C[J] with a component C[J].pos identifying the current position in the ordered list of records, and a component C[J].cont representing a range of contiguous pointers in the form <ps, pe>, where ps identifies the first pointer in the range and pe the last pointer in the range, C[J].cont being set when the current record identified by C[J].pos is read and being derived from the current record <K, p, delta>, where p is the first pointer in the range, and delta is the length of the interval of contiguous pointers, by setting ps=p and pe=ps+delta, and further characterized by having a data structure V which keeps the cursors ordered by increasing ps, said cursors being the current cursor of each list, and by having W to represent the cursor in V with the lowest ps value and the computer carrying out the following steps:
  a. initialize the current output CO to W.cont;
  b. advance the cursor in W and update V, cursors raising the end-of-scan condition during advancing, being eliminated from V, and the process terminating when all the cursors have raised the end-of-scan condition and have been eliminated, on process termination CO is output;
  c. check W, and if W.con.ps<=CO.pe+1, set CO.pe to max(CO.pe, W.pe), otherwise, output CO, and set CO to W.cont;
  d. iterate b and c.

* * * * *